United States Patent [19]

Corbett

[11] Patent Number: 4,564,072
[45] Date of Patent: Jan. 14, 1986

[54] MULTI-PURPOSE GARDEN TOOL

[76] Inventor: Peter R. Corbett, Hayne Barton, Stowford, Lewdown, Devon, EX20 4BS, United Kingdom

[21] Appl. No.: 596,457
[22] PCT Filed: Jul. 25, 1983
[86] PCT No.: PCT/GB83/00180
  § 371 Date: Mar. 21, 1984
  § 102(e) Date: Mar. 21, 1984
[87] PCT Pub. No.: WO84/00470
  PCT Pub. Date: Feb. 16, 1984

[30] Foreign Application Priority Data
  Jul. 23, 1982 [GB] United Kingdom ............. 8221276

[51] Int. Cl.⁴ .................. A01B 1/20; A01B 1/24; A01G 3/06
[52] U.S. Cl. .................................. 172/13; 172/375
[58] Field of Search ............ 172/375, 380, 13, 16, 172/18; D8/1, 11

[56] References Cited
U.S. PATENT DOCUMENTS

| | | | |
|---|---|---|---|
| 202,056 | 8/1965 | Davidson | 172/375 |
| 1,113,984 | 10/1914 | Glass | 172/13 |
| 1,244,746 | 10/1917 | Kinzel | 172/375 |
| 1,329,176 | 1/1920 | Haugen | 172/13 |
| 1,503,143 | 7/1924 | Upton | 172/381 |
| 1,906,171 | 4/1933 | McNeal | 172/375 |
| 2,133,208 | 10/1938 | Nellis | 172/13 |
| 2,184,034 | 8/1938 | Broward, Sr. | 172/13 |
| 3,029,878 | 4/1962 | McCulley | 172/13 |
| 3,065,801 | 11/1962 | Wood | 172/13 |
| 4,377,211 | 3/1983 | Voss | 172/375 |

Primary Examiner—Richard J. Johnson
Attorney, Agent, or Firm—Cushman, Darby & Cushman

[57] ABSTRACT

A garden tool with a tool head (2) comprising a flat blade portion (4) and a soil-deflection portion (5), the latter being located at one end, and to one side only, of the blade portion (4). This arrangement allows the tool head (2) to be drawn along a line to displace soil to one side thereby on the one hand, forming a shallow trench, while on the other hand, piling up earth for earthing up plants. In addition, the top end (4) of the soil-deflecting portion (5) curves round to form a soil scoop. In a preferred form of the tool, the blade portion (4) has working edges (6, 7) enabling it to be used for lawn edge trimming, and a pointed front end (8) which can be used to break up soil.

3 Claims, 1 Drawing Figure

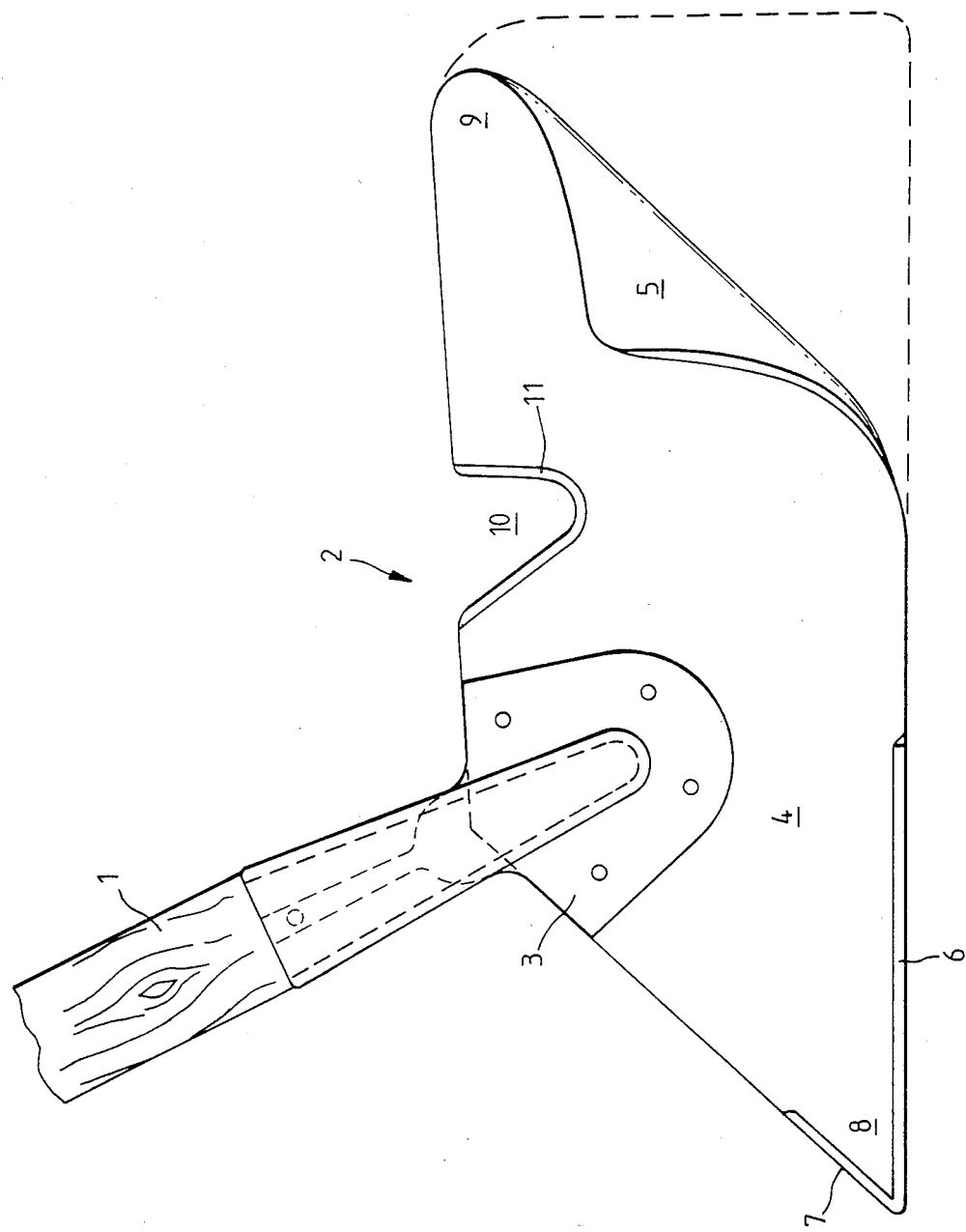

MULTI-PURPOSE GARDEN TOOL

The present invention relates to a multi-purpose garden tool and, in particular, to such a tool suitable for use both as a lawn-edge trimming tool and as a hoe.

According to one aspect of the present invention, there is provided a multi-purpose garden tool comprising a tool head carried at one end of the shaft, the tool head comprising:

- a substantially flat blade portion lying generally in the same plane as the shaft and having both a bottom edge along which the blade portion can be advanced, and a leading edge extending upwards from the bottom edge, and
- a soil-deflecting portion provided at the end of the blade portion remote from the leading edge and projecting to one side only of the blade portion, the soil-deflecting portion being arranged to deflect soil to said one side of the blade portion as the latter is advanced on, and in the direction of extent of, its bottom edge with the soil deflecting portion to the rear, the part of the soil-deflecting portion furthest from the bottom edge of the blade portion being formed as a scoop-like member which can be brought into operation to excavate soil by turning the tool around.

This arrangement allows the toolhead to be drawn along a line to displace soil to one side thereby, on the one hand, forming a shallow trench (for example, around the edge of a lawn or for use as a seed drill) while on the other hand, piling up earth as required for the earthing up of plants.

Furthermore, by turning the shaft through half a turn, the top part of the soil-deflecting portion can be used to dig individual holes for planting.

Preferably, the bottom edge and the leading edge of the blade portion are formed as cutting edges at least over part of their extent. Advantageously, the leading edge is upwardly inclined towards the end of the blade portion provided with the soil-deflecting portion thereby to provide a pointed lower front end to the blade portion. Due to this arrangement of the bottom and leading edges of the blade portion, the tool can be used not only to trim the edges of a lawn but also as a Dutch hoe, while the point of the blade portion is very useful for breaking up soil, weeding between cracks in paving slabs, and similar tasks.

Additionally, the upper edge of the blade portion can be provided with a curved recess enabling the tool to be used as a hook for drawing plant stems towards the user or for cutting these stems.

Various other novel aspects and features of the invention will become apparent from the following description given by way of example, of a multi-purpose garden tool, reference being made to the accompanying drawing the sole FIGURE of which is a side elevation of the tool head of the tool.

As shown in the drawing, the garden tool comprises a shaft 1 serving as a handle, and a tool head 2 carried at one end of the shaft 1 and secured thereto by means of a taper socket fitting 3 riveted to the tool head 2.

The tool head 2 comprises a blade portion 4 and a soil-deflecting portion 5. The blade portion 4 has a bottom working edge 6, and a leading working edge 7 inclined upwardly from the bottom edge 6 at an angle of, for example, 47°. The working edges 6 and 7 together define a pointed end 8 of the tool head 2. The shaft 1 is inclined at an angle of approximately 65° relative to the bottom working edge 6. The soil-deflecting portion 5 of the toolhead 2 curves round from the blade portion 4 on one side only of this latter portion. The tool head 2 is preferably pressed from a single flat steel plate (for example, No. 14 gauge, 2.13 mm), the original outline of this plate in the region of the soil-deflecting portion 5 being indicated by a dashed line in the drawing.

By curving the soil-deflecting portion 5 sufficiently far round, a scoop-like member is produced with a shape similar to that of an inverted cone divided into two along its axis. The upper end of the soil-deflecting portion provides a rounded end 9 to the tool head 2.

A large notch 10 is provided in the upper edge of the tool head 2 and is formed around its periphery with a cutting edge 11.

The illustrated garden tool can be put to a number of different uses, the blade portion 4 generally serving for cutting and hoeing while the soil-deflecting portion 5 can be used to displace soil sideways from a line. More particularly, the garden tool can be used for the following functions:

1. Forming a smooth rounded trench at lawn edges by drawing the tool head 2 along the edge with its soil-deflecting portion facing away from the lawn. The soil-deflecting portion 5 causes soil to be thrown clear of the lawn edge when used at a walking pace.
2. Trimming a lawn edge by applying downward foot pressure on the tool head 2 to cause the bottom working edge 6 to cut into the lawn edge. The leading working edge 7 also performs a trimming function as the tool head 2 is drawn along the side of a lawn.
3. Forming a deep trench at a lawn edge by drawing the tool head 2 along the lawn edge with its rounded end 9 pointing down.
4. Area weeding, the bottom edge 6 and pointed end 8 acting as a weed hoe as the tool head 2 is drawn backwards and forwards.
5. Cutting of weed or dead flower stalks by engaging the stalks in the notch 10 and pulling towards one.
6. Forming individual planting holes using the rounded end 9, the tool head 2 being lifted and brought down to strike the ground with the end 9.
7. Forming seed drills or furrows by drawing the tool head 2 along on the straight bottom edge 6.
8. Earthing-up of potatoes, celery, leeks, etc., by drawing the tool head 2 along between plant lines.
9. Selective weeding in rockeries and small beds using both the pointed end 8 and rounded end 9. The pointed end 8 is also useful for lawn weeding.

The tool can be used as by right or left-handed persons.

In carrying out functions (3) and (6) above, the shaft is rotated through half a turn about its axis relative to its orientation shown in the drawings thereby bringing the rounded end 9 into a downwardly-facing operative position. The forward angling of the shaft facilitates use of the rounded end. Advantageously, the curved edge of the rounded end 9 is sharpened to form a cutting edge.

Various modifications to the described tool are, of course, possible. Thus, for example, the notch 10 can be omitted.

The tool can be made in various sizes such as with a 1.5 m shaft for use in a standing position and with a 0.2 m shaft for use as a small hand tool.

I claim:

1. A multi-purpose garden tool comprising a handle and a tool head carried at one end of said handle, wherein:

said tool head includes:

a substantially flat blade portion having first and second ends and a straight bottom cutting edge, said flat blade portion and said bottom cutting edge being in the same plane as said handle, said first end of said flat blade portion having a leading cutting edge extending upwards from said bottom cutting edge in said same plane, and a soil deflecting portion provided at said second end of said flat blade portion and projecting from one side of said flat blade portion, said soil deflecting portion positioned to deflect soil to said one side of said flat blade portion as said flat blade portion is advanced forward along said bottom edge in a direction toward said leading cutting edge and a portion of said soil deflecting portion furtherest from said bottom cutting edge is formed as a scoop-like member which can be used to excavate soil; and said handle being inclined upwardly relative to said bottom edge and in a forward direction away from said soil-deflecting portion.

2. A garden tool according to claim 1, wherein said leading cutting edge of the flat blade portion is upwardly inclined from said bottom cutting edge towards said second end of said flat blade portion thereby providing a pointed gouging and plowing area of said flat blade portion.

3. A garden tool according to claim 1, wherein an edge of said flat blade portion opposite said bottom cutting edge has a curved recess for use as a hook.

* * * * *